United States Patent
Harrison et al.

[11] Patent Number: 5,792,729
[45] Date of Patent: Aug. 11, 1998

[54] DISPERSANT TERPOLYMERS

[75] Inventors: James J. Harrison, Novato; William R. Ruhe, Jr., Benicia, both of Calif.

[73] Assignee: Chevron Chemical Corporation, San Ramon, Calif.

[21] Appl. No.: 699,752

[22] Filed: Aug. 20, 1996

[51] Int. Cl.⁶ .............. C10M 149/14; C10M 155/04; C08F 267/04

[52] U.S. Cl. .............. 508/192; 508/287; 508/290; 508/291; 508/293; 525/285; 525/277; 525/327.4; 525/327.6; 525/337; 525/379; 525/380; 525/381; 525/382; 526/271; 526/318.25; 526/318.6

[58] Field of Search .............. 525/285, 379, 525/380, 381, 382, 277, 327.4, 327.6, 337; 526/271, 318.25, 318.6; 508/192, 287, 290, 291, 293

[56] References Cited

U.S. PATENT DOCUMENTS

| | | | |
|---|---|---|---|
| 3,018,250 | 1/1962 | Anderson et al. | 252/51.5 |
| 3,172,892 | 3/1965 | LeSuer et al. | 260/326.5 |
| 3,219,666 | 11/1965 | Norman et al. | 260/268 |
| 3,361,673 | 1/1968 | Stuart et al. | 252/51.5 |
| 3,381,022 | 4/1968 | LeSuer | 260/404.8 |
| 3,912,764 | 10/1975 | Palmer | 260/346.8 |
| 4,152,499 | 5/1979 | Boerzel et al. | 526/52.4 |
| 4,234,435 | 11/1980 | Meinhardt et al. | 252/51.5 A |
| 4,612,132 | 9/1986 | Wollenberg et al. | 252/51.5 A |
| 4,747,965 | 5/1988 | Wollenberg et al. | 252/51.5 A |
| 5,112,507 | 5/1992 | Harrison | 252/51.5 A |
| 5,241,003 | 8/1993 | Degonia et al. | 525/123 |
| 5,266,186 | 11/1993 | Kaplan | 208/48 AA |
| 5,277,833 | 1/1994 | Song et al. | 525/285 |
| 5,286,799 | 2/1994 | Harrison et al. | 525/285 |
| 5,319,030 | 6/1994 | Harrison et al. | 525/285 |
| 5,334,321 | 8/1994 | Harrison et al. | 508/293 |
| 5,356,552 | 10/1994 | Harrison | 252/51.5 A |
| 5,445,657 | 8/1995 | Durand et al. | 525/285 |
| 5,523,417 | 6/1996 | Blackborow et al. | 549/233 |
| 5,616,668 | 4/1997 | Harrison et al. | 526/271 |

FOREIGN PATENT DOCUMENTS

| | | | |
|---|---|---|---|
| 0 355 895 | 2/1990 | European Pat. Off. | C08F 8/46 |
| 0 587 381 | 3/1994 | European Pat. Off. | C08F 8/10 |
| 0 602 863 | 6/1994 | European Pat. Off. | C08F 8/46 |
| 0 682 102 | 11/1995 | European Pat. Off. | C10M 159/12 |
| 0 733 696 | 9/1996 | European Pat. Off. | C10M 133/52 |
| 0 733 697 | 9/1996 | European Pat. Off. | C10M 133/52 |

*Primary Examiner*—Jerry D. Johnson
*Attorney, Agent, or Firm*—Ernest A. Schaal

[57] ABSTRACT

A terpolymer having an average $M_n$ of from 600 to 100,000 is obtained by the terpolymerization of a 1-olefin having from 10 to 30 carbon atoms, maleic anhydride, and a 1,1-disubstituted polyisobutylene having an average $M_n$ of from 500 to 5,000.

16 Claims, No Drawings

5,792,729

1

DISPERSANT TERPOLYMERS

The present invention relates to novel dispersant terpolymers and polysuccinimide compositions derived from those terpolymers. In a further aspect, the invention relates to methods of preparing these compositions and their uses as dispersants in lubricating oils and deposit inhibitors in hydrocarbon fuels. In another aspect, the invention relates to concentrates, lubricating oil compositions, and hydrocarbon fuel compositions containing such novel compositions.

BACKGROUND OF THE INVENTION

Lubricating oil compositions for internal combustion engines generally contain a variety of additives to reduce or control deposits, wear, corrosion, etc. Similarly, liquid hydrocarbon fuels for internal combustion engines, at a minimum, contain additives which control or reduce the formation of deposits. The present invention is concerned with compositions useful as dispersants or deposit inhibitors.

In lubricating oils, dispersants function to control sludge, carbon, and varnish produced primarily by the incomplete oxidation of the fuel, or impurities in the fuel, or impurities in the base oil used in the lubricating oil compositions. Dispersants also control viscosity increase and prevent sludge and deposit formation due to the presence of soot in diesel engine lubricating oils.

Deposit inhibitors in fuel control or reduce engine deposits also caused by incomplete combustion of the fuel. Such deposits can form on the carburetor parts, throttle bodies, fuel injectors, intake parts, and valves. Those deposits can present significant problems, including poor acceleration and stalling, and increased fuel consumption and exhaust pollutants.

One of the most effective class of lubricating oil dispersants and fuel deposit inhibitors are polyalkylene succinimides. In some cases, the succinimides have also been found to provide fluid-modifying properties, or a so-called viscosity index credit, in lubricating oil compositions, that results in a reduction in the amount of viscosity index improver which would be otherwise have to be used. A drawback of succinimide dispersants is that they have generally been found to reduce the life of fluorocarbon elastomers. In general, for a given succinimide dispersant, a higher nitrogen content gives better dispersancy but poorer fluorocarbon elastomer compatibility.

Therefore, as well as improving the dispersancy and VI credit properties of polyalkylene succinimides, it would be desirable to improve the fluorocarbon elastomer compatibility of such dispersants. It would further be desirable to improve the stability of polyalkylene succinimides, particularly hydrolytic stability and shear stress stability. It would also be desirable to improve soot dispersancy, especially where the lubricating oil is intended for use in diesel engine crankcases.

Polyalkylene succinimides are generally prepared by the reaction of the corresponding polyalkylene succinic anhydride with a polyamine. Polyalkylene succinic anhydrides are generally prepared by a number of well-known processes. For example, there is a well-known thermal process (see, e.g., U.S. Pat. No. 3,361,673), an equally well-known chlorination process (see, e.g., U.S. Pat. No. 3,172,892), a combination of the thermal and chlorination processes (see, e.g., U.S. Pat. No. 3,912,764), and free radical processes (see, e.g., U.S. Pat. Nos. 5,286,799 and 5,319,030). Such compositions include one-to-one monomeric adducts (see,

2 e.g., U.S. Pat. Nos. 3,219,666 and 3,381,022), as well as high succinic ratio products, adducts having alkenyl-derived substituents adducted with at least 1.3 succinic groups per alkenyl-derived substituent (see, e.g., U.S. Pat. No. 4,234,435).

Polyalkylene succinic anhydrides can be produced thermally also from high methylvinylidene polybutene as disclosed in U.S. Pat. No. 4,152,499. This is further discussed in U.S. Pat. No. 5,241,003 for the case where the succinic ratio is less than 1.3 and in EP 0 355 895 for the case where the succinic ratio is greater than 1.3. European Applications EP 0 602 863 and EP 0 587 381, and U.S. Pat. No. 5,523,417 disclose a procedure for washing out the polymaleic anhydride resin from polyalkylene succinic anhydride prepared from high methylvinylidene polybutene. A polyalkylene succinic anhydride with a succinic ratio of 1.0 is disclosed. One advantage of polyalkylene succinic anhydride from high methylvinylidene polybutene is that it can be prepared essentially free of chlorine.

U.S. Pat. Nos. 3,361,673 and 3,018,250 describe the reaction of an alkenyl- or alkyl-substituted succinic anhydride with a polyamine to form alkenyl or alkyl succinimide lubricating oil dispersants and/or detergent additives.

U.S. Pat. No. 4,612,132 teaches that alkenyl or alkyl succinimides may be modified by reaction with a cyclic or linear carbonate or chloroformate such that one or more of the nitrogens of the polyamine moiety is substituted with a hydrocarbyl oxycarbonyl, a hydroxyhydrocarbyl oxycarbonyl, or a hydroxy poly(oxyalkylene) oxycarbonyl. These modified succinimides are described as exhibiting improved dispersancy and/or detergency in lubricating oils.

U.S. Pat. No. 4,747,965 discloses modified succinimides similar to those disclosed in U.S. Pat. No. 4,612,132, except that the modified succinimides are described as being derived from succinimides having an average of greater than 1.0 succinic groups per long chain alkenyl substituent.

A recent article by S. T. Roby, R. E. Kornbrekke, and J. A. Supp, "Deposit Formulation in Gasoline Engines, Part 2, Dispersant Effects on Sequence VE Deposits," JOURNAL OF THE SOCIETY OF TRIBOLOGISTS AND LUBRICATION ENGINEERS, Vol. 50, 12, 989–995 (December 1994) teaches that the length of the dispersant alkyl side chain influences deposit control performance, and that, at the same nitrogen level, the low molecular weight (side chain 1000 daltons) dispersants that were tested were poorer than the tested high molecular weight (side chain 2000 daltons) succinimide dispersants. This teaching is also consistent with our prior observation comparing 950 $M_n$ side chain succinimides with 2200 $M_n$ side chain succinimides.

U.S. Pat. No. 4,234,435 teaches a preferred polyalkene-derived substituent group with a $M_n$ in the range of 1500–3200. For polybutenes, an especially preferred $M_n$ range is 1700–2400. This patent also teaches that the succinimides must have a succinic ratio of at least 1.3. That is, there should be at least 1.3 succinic groups per equivalent weight of polyalkene-derived substituent group. Most preferably, the succinic ratio should be from 1.5 to 2.5. This patent further teaches that its dispersants also provide an improvement in viscosity index. That is, these additives impart fluidity modifying properties to lubricant compositions containing them. This is considered desirable for use in multigrade lubricating oils but undesirable for single-grade lubricating oils.

Polyamino alkenyl or alkyl succinimides and other additives useful as dispersants and/or detergents, such as Mannich bases, contain basic nitrogen. While basicity is an important property to have in the dispersant/detergent additive, it is believed that the initial attack on fluorocarbon elastomer seals used in some engines involves attack by the basic nitrogen. This attack leads to the loss of fluoride ions, and eventually results in cracks in the seals and loss of other desirable physical properties in the elastomer.

A variety of post-treatments for improving various properties of alkenyl succinimides are known to the art, a number of which are described in U.S. Pat. No. 5,241,003.

Example 2 of U.S. Pat. No. 5,266,186 discloses the preparation of dispersants by reacting certain polyisobutenyl-succinic anhydride adducts (see footnote 2 of Table 2) with ethylenediamine, followed by reaction with a maleic anhydride/alpha-olefin copolymer. The patent teaches that, by functioning as an iron sulfide dispersant, the product is useful to inhibit sludge deposits in refinery processing equipment caused by the heat treatment of hydrocarbon feed stocks.

U.S. Pat. No. 5,112,507 discloses a polymeric ladder type polymeric succinimide dispersant in which each side of the ladder is a long chain alkyl or alkenyl, generally having at least about 30 carbon atoms, preferably at least about 50 carbon atoms. The dispersant is described as having improved hydrolytic stability and shear stress stability, produced by the reaction of certain maleic anhydride-olefin copolymers with certain polyamines. The patent further teaches that the polymer may be post-treated with a variety of post-treatments, and describes procedures for post-treating the polymer with cyclic carbonates, linear mono- or polycarbonates; boron compounds (e.g., boric acid), and fluorophosphoric acid and ammonia salts thereof.

U.S. Pat. Nos. 5,334,321 and 5,356,552 disclose certain cyclic carbonate post-treated alkenyl or alkylsuccinimides having improved fluorocarbon elastomer compatibility, which are preferably prepared by the reaction of the corresponding substituted succinic anhydride with a polyamine having at least four nitrogen atoms per molecule.

European Application, EP 0 682 102 A2 discloses a process which comprises reacting: a copolymer of an olefin and maleic anhydride, an acyclic hydrocarbyl-substituted succinic acylating agent, and an alkylene polyamine. These products are useful in lubricating oil compositions as additives for use as dispersants having viscosity index improver properties.

SUMMARY OF THE INVENTION

The present invention provides a terpolymer composition comprising the reaction product obtained by the terpolymerization of a 1-olefin having at least five carbon atoms, an unsaturated acidic reagent, and a 1,1-disubstituted olefin.

Preferably, the 1-olefin has an average of from 10 to 30 carbon atoms, the unsaturated acidic agent is maleic anhydride, the 1,1-disubstituted olefin is a 1,1-disubstituted polyisobutylene having an average $M_n$ of from 500 to 5,000, and the terpolymer has an average $M_n$ of from 600 to 100,000.

The terpolymer is produced in the liquid phase, as opposed to U.S. Pat. No. 5,445,657 that uses gaseous isobutylene, which requires pressurized systems.

A polysuccinimide can be prepared by reacting a mixture under reactive conditions, wherein the mixture comprises our novel terpolymer and either an amine or a polyamine. That mixture should contain from 0.1 to 1.5 equivalents of the nitrogen-containing compound per equivalent of acidic groups in the terpolymer. Preferably, the nitrogen-containing compound is a polyamine having at least three nitrogen atoms and 4 to 20 carbon atoms.

The polysuccinimide can further comprise at least one of the following:

(a) an alkenyl or alkylsuccinic acid derivative.

(b) a copolymer of a first unsaturated acidic reagent and a 1-olefin, (c) a copolymer of a second unsaturated acidic reagent and a 1,1-disubstituted olefin, (d) a polycarboxylic acid derivative, and (e) mixtures thereof, wherein the first unsaturated acidic reagent and the second unsaturated acidic reagent are the same or different.

The present invention further comprises from 20 to 60 wt. % of this polysuccinimide composition and from 80 to 40 wt. % of an organic diluent; a lubricating oil composition comprising a major amount of an oil of lubricating viscosity and a minor amount of this polysuccinimide composition; and a fuel composition comprising a major amount of a hydrocarbon having a boiling point in the gasoline or diesel fuel range and an amount of this polysuccinimide composition that is effective to reduce injection or chamber deposits.

The present invention also involves post-treated polymers prepared by treating the succinimide compositions prepared by this process with a cyclic carbonate, a linear mono- or poly-carbonate, or a boron compound under reactive conditions.

DETAILED DESCRIPTION OF THE INVENTION

In its broadest aspect, this invention involves not only a novel terpolymer, but also a polysuccinimide composition. The terpolymers of this invention comprise the reaction product obtained by the terpolymerization of a 1-olefin having at least five carbon atoms, an unsaturated acidic reagent, and a 1,1-disubstituted olefin.

Definitions

As used herein the following terms have the following meanings, unless expressly stated to the contrary.

The term "terpolymer" refers to a polymer having three different types of repeating units.

The term "1-olefin" refers to a monosubstituted olefin that has the double bond in the 1-position. They can also be called alpha-olefins, and have the following structure:

$CH_2=CHR$ where R is the rest of the olefin molecule.

The term "1,1-disubstituted olefin" refers to a disubstituted olefin, also called a vinylidene olefin, that has the following structure:

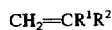

$CH_2=CR^1R^2$ where $R^1$ and $R^2$ are the same or different, and constitute the rest of the olefin molecule. Preferably, either $R^1$ or $R^2$ is a methyl group, and the other is not.

The term "Total Base Number" or "TBN" refers to the amount of base equivalent to milligrams of KOH in 1 gram of sample. Thus, higher TBN numbers reflect more alkaline products and therefore a greater alkalinity reserve. The TBN of a sample can be determined by ASTM Test No. D2896 or any other equivalent procedure.

The term "SAP" refers to Saponification Number, which is reported in milligrams of KOH per grm of sample, and is a measure of the amount of acid groups in a gram of sample. SAP can be determined by the procedure described in ASTM D94 or any other equivalent procedure.

The term "TAN" refers to Total Acid Number, which refers to the amount of acid equivalent to milligrams of KOH in 1 gram of sample. TAN can be determined by the procedure described in ASTM D 664 or any other equivalent procedure.

The term "succinimide" is understood in the art to include many of the amide, imide, etc. species which are also formed by the reaction of a succinic anhydride with an amine. The predominant product, however, is succinimide and this term has been generally accepted as meaning the product of a reaction of an alkenyl- or alkyl-substituted succinic acid or anhydride with a polyamine. Alkenyl or alkyl succinimides are disclosed in numerous references and are well known in the art. Certain fundamental types of succinimides and related materials encompassed by the term of art "succinimide" are taught in U.S. Pat. Nos. 2,992,708; 3,018,291; 3,024,237; 3,100,673; 3,219,666; 3,172,892; and 3,272,746, the disclosures of which are hereby incorporated by reference.

The "succinic ratio" or "succination ratio" refers to the ratio calculated in accordance with the procedure and mathematical equation set forth in columns 5 and 6 of U.S. Pat. No. 5,334,321, hereby incorporated by reference. The calculation is asserted to represent the average number of succinic groups in an alkenyl or alkylsuccinic anhydride per alkenyl or alkyl chain.

The term "alkenyl or alkylsuccinic acid derivative" refers to a structure having the formula:

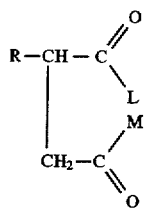

wherein L and M are independently selected from the group consisting of —OH, —Cl, —O—, lower alkyl or taken together are —O— to form an alkenyl or alkylsuccinic anhydride group.

The term "unsaturated acidic reagent" refers to maleic or fumaric reactants of the general formula:

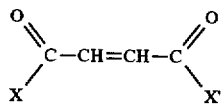

wherein X and X' are the same or different, provided that at least one of X and X' is a group that is capable of reacting to esterify alcohols, form amides, or amine salts with ammonia or amines, form metal salts with reactive metals or basically reacting metal compounds and otherwise function as acylating agents. Typically, X and/or X' is —OH, —O-hydrocarbyl, —OM$^+$ where M$^+$ represents one equivalent of a metal, ammonium or amine cation, —NH$_2$, —Cl, —Br, and taken together X and X' can be —O— so as to form an anhydride. Preferably, X and X' are such that both carboxylic functions can enter into acylation reactions. Maleic anhydride is a preferred unsaturated acidic reactant. Other suitable unsaturated acidic reactants include electron-deficient olefins such as monophenyl maleic anhydride; monomethyl, dimethyl, monochloro, monobromo, monofluoro, dichloro and difluoro maleic anhydride, N-phenyl maleimide and other substituted maleimides; isomaleimides; fumaric acid, maleic acid, alkyl hydrogen maleates and fumarates, dialkyl fumarates and maleates, fumaronilic acids and maleanic acids; and maleonitrile, and fumaronitrile.

The term "polycarboxylic acid derivative" refers to a homopolymer of an unsaturated acidic reactant or a polymer of mixtures of unsaturated acidic reactants. Preferably, the polycarboxylic acid derivative is a polymaleic anhydride.

The Terpolymer

The terpolymers of this invention contain three components consisting of an unsaturated acidic reagent, a 1-olefin, and a 1,1-disubstituted olefin. They can be random terpolymers or alternating terpolymers or block terpolymers and can be prepared by known procedures for making copolymers. Preferably, the unsaturated acidic reagent is maleic anhydride.

We use 1-olefins from C$_{10}$ to C$_{30}$ because these materials are commercially readily available, and because they offer a desirable balance of the length of the molecular tail, and the solubility of the terpolymer in nonpolar solvents. Mixtures of olefins, e.g., C$_{14}$, C$_{16}$, and C$_{18}$, are especially desirable.

We use 1,1-disubstituted olefins to provide a high molecular weight, oil soluble tail in the terpolymer. Preferably the 1,1-disubstituted olefin has an average M$_n$ of from 500 to 5000. One particularly useful 1,1-disubstituted olefin is a 1,1-disubstituted polyisobutylene, such as methylvinylidene polyisobutylene.

The degree of polymerization of the terpolymers can vary over a wide range. In general, terpolymers of high molecular weight can be produced at low temperatures, and terpolymers of low molecular weight can be produced at high temperatures.

The terpolymerization is conducted in the presence of a suitable free radical initiator; typically a peroxide type initiator, e.g., di(t-butyl) peroxide dicumyl peroxide or azo type initiator, e.g., isobutylnitrile type initiators. Procedures for preparing poly 1-olefin copolymers are, for example, described in U.S. Pat. Nos. 3,560,455 and 4,240,916, hereby incorporated by reference in their entirety. Those procedures could be used to prepare terpolymers. Both patents also describe a variety of initiators.

Synthesis of the Polysuccinimide

The polysuccinimide of the present invention can be prepared by reacting a mixture of a terpolymer and a nitrogen-containing compound (amine or polyamine) under reactive conditions. The mixture should contain from 0.1 to 1.5 equivalents of nitrogen-containing compound per equivalent of acidic groups in the terpolymer.

The reaction mixture can also contain any of the following:

(a) an alkenyl or alkylsuccinic acid derivative,
(b) a copolymer of a first unsaturated acidic reagent and a 1-olefin,
(c) a copolymer of a second unsaturated acidic reagent and a 1,1-disubstituted olefin, and
(d) a polycarboxylic acid derivative, and
(e) mixtures thereof.

It may be desirable to conduct the reaction in an inert organic solvent. Optimum solvents will vary with the particular terpolymer and can be determined from literature sources or routine experimentations. For example, in the case of maleic anhydride poly 1-olefin terpolymers, we found that 100N diluent oil and mixtures of C$_9$ aromatic solvents are acceptable solvents.

Typically, the reaction is conducted at temperatures in the range of about from 60° C. to 180° C., preferably 150° C. to 170° C. for about from 1 to 10 hours, preferably 4 to 6 hours. Typically the reaction is conducted at about atmospheric pressure; however, higher or lower pressures can also be used depending on the reaction temperature desired and the boiling point of the reactants or solvent.

Water, present in the system or generated by this reaction, is preferably removed from the reaction system during the course of the reaction via azeotroping or distillation. After reaction completion, the system can be stripped at elevated temperatures (typically 100° C. to 250° C.) and reduced pressures to remove any volatile components which may be present in the product.

The Nitrogen-Containing Compound

The nitrogen-containing compound can be either an amine or a polyamine. Preferably, it is a polyamine having at least three amine nitrogen atoms per mole, and preferably 4 to 12 amine nitrogens per molecule. Most preferred are polyamines having from about 6 to about 10 nitrogen atoms per molecule. The number of amine nitrogen atoms per molecule of polyamine is calculated as follows:

$$\text{Average number of nitrogen atoms in molecule of polyamine} = \frac{\% N \times M_{pa}}{14 \times 100}$$

wherein

% N=percent nitrogen in polyamine or polyamine mixture $M_{pa}$=number average molecular weight of the polyamine or polyamine mixture Preferred polyalkylene polyamines also contain from about 4 to about 20 carbon atoms, there being preferably from 2 to 3 carbon atoms per alkylene unit. The polyamine preferably has a carbon-to-nitrogen ratio of from 1:1 to 10:1.

Examples of suitable polyamines that can be used to form the compounds of this invention include the following: tetraethylene pentamine, pentaethylene hexamine, Dow E-100® heavy polyamine ($M_n$=303, available from Dow Chemical Company, Midland, Mich.), and Union Carbide HPA-X heavy polyamine ($M_n$=275, available from Union Carbide Corporation, Danbury, Conn.). Such amines encompass isomers, such as branched-chain polyamines, and the previously mentioned substituted polyamines, including hydrocarbyl-substituted polyamines. HPA-X heavy polyamine ("HPA-X") contains an average of approximately 6.5 amine nitrogen atoms per molecule. Such heavy polyamines generally afford excellent results.

The polyamine reactant may be a single compound but typically will be a mixture of compounds reflecting commercial polyamines. Typically the commercial polyamine will be a mixture in which one or several compounds predominate with the average composition indicated. For example, tetraethylene pentamine prepared by the polymerization of aziridine or the reaction of dichloroethylene and ammonia will have both lower and higher amine members, e.g., triethylene tetramine ("TETA"), substituted piperazines and pentaethylene hexamine, but the composition will be largely tetraethylene pentamine and the empirical formula of the total amine composition will closely approximate that of tetraethylene pentamine.

Other examples of suitable polyamines include admixtures of amines of various molecular weights. Included within these suitable polyamines are mixtures of diethylene triamine ("DETA") and heavy polyamine. A preferred polyamine admixture reactant is a mixture containing 20% by weight DETA and 80% by weight HPA-X; as determined by the method described above, this preferred polyamine reactant contains an average of about 5.2 nitrogen atoms per mole.

Methods of preparation of polyamines and their reactions are detailed in Sidgewick's THE ORGANIC CHEMISTRY OF NITROGEN, Clarendon Press, Oxford, 1966; Noller's CHEMISTRY OF ORGANIC COMPOUNDS, Saunders, Philadelphia, 2nd Ed., 1957; and Kirk-Othmer's ENCYCLOPEDIA OF CHEMICAL TECHNOLOGY, 2nd Ed., especially Volumes 2, pp. 99–116.

The Alkenyl or Alkylsuccinic Acid Derivatives

Alkyl and alkenylsuccinic acid derivatives having a calculated succinic ratio of about from 1.0:1 to 2.5:1, and preferably about from 1.0:1 to 1.5:1, may be used in the present process. More preferably, the alkyl or alkenyl succinic acid derivatives have a succination ratio of about from 1.0:1 to 1.2:1. Most preferably, alkyl or alkenylsuccinic anhydrides are used. Accordingly, we prefer to use alkenyl succinic anhydride prepared by the thermal process, both because the calculated succination ratio of material prepared by this process is typically 1.0 to 1.2, and because the product is essentially chlorine-free because chlorine is not used in the synthesis.

The thermal reaction of a polyolefin with maleic anhydride is well known and is described, for example, in U.S. Pat. No. 3,361,673. Less desirable is the chlorination process characterized by the reaction of a chlorinated polyolefin, with maleic anhydride, which is also well known and is described, for example, in U.S. Pat. No. 3,172,189. Various modifications of the thermal process and chlorination process are also well known, some of which are described in U.S. Pat. Nos. 4,388,471; 4,450,281; 3,018,250 and 3,024,195. Free radical procedures for preparing alkenyl succinic anhydrides are, for example, described in U.S. Pat. Nos. 5,286,799 and 5,319,030. Also desirable are alkenyl succinic anhydrides prepared by the reaction of high methylvinylidene polyisobutene with unsaturated succinic acid derivatives as described in U.S. Pat. Nos. 4,152,499 and 5,241,003, and European Application EP 0 355 895. All of the above referenced patents are hereby incorporated herein by reference in their entirety.

In accordance with the invention, the alkenyl or alkyl succinic anhydride reactant is derived from a polyolefin having a $M_n$ from 1000 to 5000 and a $M_w/M_n$ ratio of 1:1 to 5:1. In a preferred embodiment, the alkenyl or alkyl group of the succinimide has a $M_n$ value from 1800 to 3000. Most preferred are alkenyl or alkyl substituents having a $M_n$ of from 2000 to 2500.

Suitable polyolefin polymers for reaction with maleic anhydride include polymers comprising a major amount of $C_2$ to $C_5$ monoolefin, e.g., ethylene, propylene, butylene, iso-butylene and pentene. The polymers can be homopolymers, such as polyisobutylene, as well as copolymers of two or more such olefins, such as copolymers of: ethylene and propylene, butylene, and isobutylene, etc. Other copolymers include those in which a minor amount of the copolymer monomers (e.g., 1 to 20 mole percent), is a $C_4$ to $C_8$ nonconjugated diolefin, e.g., a copolymer of isobutylene and butadiene or a terpolymer of ethylene, propylene and 1,4-hexadiene, etc.

A particularly preferred class of olefin polymers for reaction with maleic anhydride comprises the polybutenes, which are prepared by polymerization of one or more of 1-butene, 2-butene and isobutene. Especially desirable are polybutenes containing a substantial proportion of units derived from isobutene. The polybutene may contain minor amounts of butadiene, which may or may not be incorporated in the polymer. These polybutenes are readily available commercial materials well known to those skilled in the art. Examples of procedures illustrating the preparation of such material can be found, for example, in U.S. Pat. Nos.

3,215,707; 3,231,587; 3,515,669; 3,579,450; 3,912,764 and 4,605,808, hereby incorporated by reference for their disclosures of suitable polybutenes.

The alkenyl or alkylsuccinic anhydride may also be prepared using the so-called highly reactive or high methyl vinylidene polyalkylene, most commonly polyisobutene, such as described in U.S. Pat. Nos. 4,152,499; 5,071,919; 5,137,980; 5,286,823; 5,254,649; published International Applications Numbers WO 93 24539-A1; WO 9310063-A1; and published European Pat. Applications Numbers 0355895-A; 0565285A; and 0587381A, all of which are hereby incorporated by reference in their entirety. Other polyalkenes can also be used including, for example, polyalkenes prepared using metallocene catalysts such as described in published German patent application DE 4313088A1.

The Copolymers

The unsaturated acidic reagent copolymers used in the present invention can be random copolymers or alternating copolymers, and can be prepared by known procedures. Further, in most instances, examples of each class are readily commercially available. Such copolymers may be prepared by the free radical reaction of an unsaturated acidic reagent with the corresponding olefin. Preferably, the unsaturated acidic reagent copolymer can be prepared by the free radical reaction of maleic anhydride with the corresponding olefin.

The main difference between the two copolymers is the olefin used. In the first copolymer, the olefin is a 1,1-disubstituted olefin. In the second copolymer, the olefin is a 1-olefin. The unsaturated acidic reagents in these copolymers can be the same or different.

For the second copolymer, we prefer to use alpha olefins from $C_{10}$ to $C_{30}$ because these materials are commercially readily available, and because they offer a desirable balance of the length of the molecular tail, and the solubility of the copolymer in non polar solvents. Mixtures of olefins, e.g., $C_{14}$, $C_{16}$, and C18, are especially desirable.

The degree of polymerization of the copolymers can vary over a wide range. In general, copolymers of high molecular weight can be produced at low temperatures, and copolymers of low molecular weight can be produced at high temperatures.

The copolymerization is conducted in the presence of a suitable free radical initiator; typically a peroxide type initiator, e.g., di(t-butyl) peroxide, dicumyl peroxide, or azo type initiator, e.g., isobutyinitrile type initiators. Procedures for preparing poly 1-olefin copolymers are, for example, described in U.S. Pat. Nos. 3,560,455 and 4,240,916, hereby incorporated by reference in their entirety. Both patents also describe a variety of initiators.

Polycarboxylic Acid Derivatives

The polycarboxylic acid derivative comprises a homopolymer of an unsaturated acidic reactant, a polymer of mixtures of unsaturated acidic reactants, or mixtures thereof. Methods of preparation of polycarboxylic acid derivatives are described by B. C. Trivedi and B. M. Culbertson in "Maleic Anhydride," Plenum Press, New York and London, 1982, pp. 246,263,264. Preferably, the polycarboxylic acid derivative is polymaleic anhydride. Free radical procedures for preparing polymaleic anhydride, for example, are described in West German Pat. 2,405,284 and British. Pat. 1,529,092. All the above referenced patents are hereby incorporated herein by reference in their entirety.

Optional Modifications

The polysuccinimide can also be prepared in the presence of grafted Viscosity Index Improver polymers under reactive conditions to produce a Viscosity Index Improver polymer with dispersant properties. An example of such a grafted Viscosity Index Improver polymer is an oil soluble ethylene copolymer having an Mn from 5000 to 500,000 that is grafted with an ethylenically unsaturated carboxylic acid material having one or two acid or anhydride moieties. Descriptions of grafted Viscosity Index Improver polymers and their preparation are found in U.S. Pat. 5,356,551 hereby incorporated herein by reference in its entirety.

Post-Treatments

We have found that the dispersancy of the present polymers is generally further improved by reaction with a cyclic carbonate. This may result in some reduction in fluorocarbon elastomer compatibility. However, this generally can be more than offset by reducing the concentration of the carbonated post-treated polymer in light of the increased dispersancy. The cyclic carbonate post-treatment is especially advantageous where the dispersant will be used in engines which do not have fluorocarbon elastomer seals. The resulting modified polymer has one or more nitrogens of the polyamino moiety substituted with a hydroxy hydrocarbyl oxycarbonyl, a hydroxy poly(oxyalkylene) oxycarbonyl, a hydroxyalkylene, hydroxyalkylenepoly-(oxyalkylene), or mixture thereof.

The cyclic carbonate post-treatment is conducted under conditions sufficient to cause reaction of the cyclic carbonate with secondary amino groups of the polyamino substituents. Typically, the reaction is conducted at temperatures of about from 0° C. to 250° C. preferably about from 100° C. to 200° C. Generally, best results are obtained at temperatures of about from 150° C. to 180° C.

The reaction may be conducted neat, wherein both the polymer and the cyclic carbonate are combined in the proper ratio, either alone or in the presence of a catalyst (such as an acidic, basic or Lewis acid catalyst). Depending on the viscosity of the polymer reactant, it may be desirable to conduct the reaction using an inert organic solvent or diluent, for example, toluene, xylene. Examples of suitable catalysts include, for example, phosphoric acid, boron trifluoride, alkyl or aryl sulfonic acid, alkali or alkaline carbonate.

The reaction of polyamino alkenyl or alkyl succinimides with cyclic carbonates is known in the art and is described in U.S. Pat. No. 4,612,132, hereby incorporated by reference, in its entirety. Generally, the procedures described to post-treat polyamino alkenyl or alkyl succinimides with cyclic carbonates can also be applied to post-treat the present polymers.

A particularly preferred cyclic carbonate is 1,3-dioxolan-2-one (ethylene carbonate) because it affords excellent results and also because it is readily commercially available.

The molar charge of cyclic carbonate employed in the post-treatment reaction is preferably based upon the theoretical number of basic nitrogens contained in the polyamino substituent of the succinimide. Thus, when one equivalent of tetraethylene pentamine ("TEPA") is reacted with one equivalent of succinic anhydride and one equivalent of copolymer, the resulting bis succinimide will theoretically contain 3 basic nitrogens. Accordingly, a molar charge of 2 would require that two moles of cyclic carbonate be added for each basic nitrogen or in this case 6 moles of cyclic carbonate for each mole equivalent of polysuccinimide or succinimide prepared from TEPA. Mole ratios of the cyclic carbonate to the basic amine nitrogen of the polyamino alkenyl succinimide employed in the process of this invention are typically in the range of from about 1:1 to about 4:1; although preferably from about 2:1 to about 3:1.

As described in U.S. Pat. No. 4,612,132, cyclic carbonates may react with the primary and secondary amines of a polyamino alkenyl or alkyl succinimide to form two types of compounds. In the first instance, strong bases, including unhindered amines such as primary amines and some secondary amines, react with an equivalent of cyclic carbonate to produce a carbamic ester. In the second instance, hindered bases, such as hindered secondary amines, may react with an equivalent of the same cyclic carbonate to form a hydroxyalkyleneamine linkage. (Unlike the carbamate products, the hydroxyalkyleneamine products retain their basicity.) Accordingly, the reaction of a cyclic carbonate may yield a mixture of products. When the molar charge of the cyclic carbonate to the basic nitrogen of the succinimide is about 1 or less, a large portion of the primary and secondary amines of the succinimide will be converted to hydroxy hydrocarbyl carbamic esters with some hydroxyhydrocarbylamine derivatives also being formed. As the mole ratio is raised above 1, increased amounts of poly(oxyalkylene) polymers of the carbamic esters and the hydroxyhydrocarbylamine derivatives are produced.

Both the polymers and post-treated polymers of this invention can also be reacted with boric acid or a similar boron compound to form borated dispersants having utility within the scope of this invention. In addition to boric acid (boron acid), examples of suitable boron compounds include boron oxides, boron halides and esters of boric acid. Generally from about 0.1 equivalents to 10 equivalents of boron compound to the modified succinimide may be employed.

In addition to the carbonate and boric acid post-treatments both the compounds may be post-treated, or further post-treatment, with a variety of post-treatments designed to improve or impart different properties. Such post-treatments include those summarized in columns 27–29 of U.S. Pat. No. 5,241,003, hereby incorporated by reference. Such treatments include, treatment with:

Inorganic phosphorous acids or anhydrates (e.g., U.S. Pat. Nos. 3,403,102 and 4,648,980);

Organic phosphorous compounds (e.g., U.S. Pat. No. 3,502,677);

Phosphorous pentasulfides;

Boron compounds as already noted above (e.g., U.S. Pat. Nos. 3,178,663 and 4,652,387);

Carboxylic acid, polycarboxylic acids, anhydrides and/or acid halides (e.g., U.S. Pat. Nos. 3,708,522 and 4,948,386);

Epoxides polyepoxiates or thioexpoxides (e.g., U.S. Pat. Nos. 3,859,318 and 5,026,495);

Aldehyde or ketone (e.g., U.S. Pat. No. 3,458,530);

Carbon disulfide (e.g., U.S. Pat. No. 3,256,185);

Glycidol (e.g., U.S. Pat. No. 4,617,137);

Urea, thourea or guanidine (e.g., U.S. Pat. Nos. 3,312,619; 3,865,813; and British Pat. GB 1,065,595);

Organic sulfonic acid (e.g., U.S. Pat. No. 3,189,544 and British Pat. GB 2,140,811);

Alkenyl cyanide (e.g., U.S. Pat. Nos. 3,278,550 and 3,366,569);

Diketene (e.g., U.S. Pat. No. 3,546,243);

A diisocyanate (e.g., U.S. Pat. No. 3,573,205);

Alkane sultone (e.g., U.S. Pat. No. 3,749,695);

1,3-Dicarbonyl Compound (e.g., U.S. Pat. No. 4,579,675);

Sulfate of alkoxylated alcohol or phenol (e.g., U.S. Pat. No. 3,954,639);

Cyclic lactone (e.g., U.S. Pat. Nos. 4,617,138; 4,645,515; 4,668,246; 4,963,275; and 4,971,711);

Cyclic carbonate or thiocarbonate linear monocarbonate or polycarbonate, or chloroformate (e.g., U.S. Pat. Nos. 4,612,132; 4,647,390; 4,648,886; 4,670,170);

Nitrogen-containing carboxylic acid (e.g., U.S. Pat. 4,971,598 and British Pat. GB 2,140,811);

Hydroxy-protected chlorodicarbonyloxy compound (e.g., U.S. Pat. No. 4,614,522);

Lactam, thiolactam, thiolactone or ditholactone (e.g., U.S. Pat. Nos. 4,614,603 and 4,666,460);

Cyclic carbamate, cyclic thiocarbamate or cyclic dithiocarbamate (e.g., U.S. Pat. Nos. 4,663,062 and 4,666,459);

Hydroxyaliphatic carboxylic acid (e.g., U.S. Pat. Nos. 4,482,464; 4,521,318; 4,713,189);

Oxidizing agent (e.g., U.S. Pat. No. 4,379,064);

Combination of phosphorus pentasulfide and a polyalkylene polyamine (e.g., U.S. Pat. No. 3,185,647);

Combination of carboxylic acid or an aldehyde or ketone and sulfur or sulfur chloride (e.g., U.S. Pat. Nos. 3,390,086; 3,470,098);

Combination of a hydrazine and carbon disulfide (e.g. U.S. Pat. No. 3,519,564);

Combination of an aldehyde and a phenol (e.g., U.S. Pat. Nos. 3,649,229; 5,030,249; 5,039,307);

Combination of an aldehyde and an O-diester of dithiophosphoric acid (e.g., U.S. Pat. No. 3,865,740);

Combination of a hydroxyaliphatic carboxylic acid and a boric acid (e.g., U.S. Pat. No. 4,554,086);

Combination of a hydroxyaliphatic carboxylic acid, then formaldehyde and a phenol (e.g., U.S. Pat. No. 4,636,322);

Combination of a hydroxyaliphatic carboxylic acid and then an aliphatic dicarboxylic acid (e.g., U.S. Pat. No. 4,663,064);

Combination of formaldehyde and a phenol and then glycolic acid (e.g., U.S. Pat. No. 4,699,724);

Combination of a hydroxyaliphatic carboxylic acid or oxalic acid and then a diisocyanate (e.g. U.S. Pat. No. 4,713,191);

Combination of inorganic acid or anhydride of phosphorus or a partial or total sulfur analog thereof and a boron compound (e.g., U.S. Pat. No. 4,857,214);

Combination of an organic diacid then an unsaturated fatty acid and then a nitrosoaromatic amine optionally followed by a boron compound and then a glycolating agent (e.g., U.S. Pat. No. 4,973,412);

Combination of an aldehyde and a triazole (e.g., U.S. Pat. No. 4,963,278);

Combination of an aldehyde and a triazole then a boron compound (e.g., U.S. Pat. No. 4,981,492);

Combination of cyclic lactone and a boron compound (e.g., U.S. Pat. No. 4,963,275 and 4,971,711).

Lubricating Oil Compositions and Concentrates

The compositions of this invention may be compatible with fluorocarbon elastomer seals, at concentrations at which they are effective as detergent and dispersant additives in lubricating oils. When employed in this manner, the modified polyamino alkenyl or alkyl succinimide additive is usually present in from 1 to 5 percent by weight (on a dry polymer basis) to the total composition and preferably less than 3 percent by weight (on a dry or actives polymer basis). Dry or actives basis indicates that only the active ingredient of this invention are considered when determining the amount of the additive relative to the remainder of a composition (e.g., lube oil composition, lube oil concentrate, fuel composition or fuel concentrate). Diluents and any other inactives are excluded. Unless otherwise indicated, in describing the lubricating oil and final compositions or concentrates, dry or active ingredient contents are intended with respect to the polysuccinimides. This includes the novel polysuccinimides of the present invention and also other reaction product or byproducts in the reaction product mixture which function as dispersants.

The lubricating oil used with the additive compositions of this invention may be mineral oil or synthetic oils of lubricating viscosity and preferably suitable for use in the crankcase of an internal combustion engine. Crankcase lubricating oils typically have a viscosity of about 1300 cSt at 0° F. (−17.8° C.) to 22.7 cSt at 210° F. (99° C.). The lubricating oils may be derived from synthetic or natural sources. Mineral oil for use as the base oil in this invention includes paraffinic, naphthenic and other oils that are ordinarily used in lubricating oil compositions. Synthetic oils include both hydrocarbon synthetic oils and synthetic esters. Useful synthetic hydrocarbon oils include liquid polymers of alpha olefins having the proper viscosity. Especially useful are the hydrogenated liquid oligomers of $C_6$ to $C_{12}$ alpha olefins such as 1-decene trimer. Likewise, alkyl benzenes of proper viscosity such as didodecyl benzene can be used. Useful synthetic esters include the esters of both monocarboxylic acid and polycarboxylic acids as well as monohydroxy alkanols and polyols. Typical examples are didodecyl adipate, pentaerythritol tetracaproate, di-2-ethylhexyl adipate, dilaurylsebacate and the like. Complex esters prepared from mixtures of mono and dicarboxylic acid and mono and dihydroxy alkanols can also be used.

Blends of hydrocarbon oils with synthetic oils are also useful. For example, blends of 10 to 25 weight percent hydrogenated 1-decene trimer with 75 to 90 weight percent 150 SUS (100° F.) mineral oil gives an excellent lubricating oil base.

Other additives which may be present in the formulation include detergents (overbased and non-overbased), rust inhibitors, foam inhibitors, corrosion inhibitors, metal deactivators, pour point depressants, antioxidants, wear inhibitors, zinc dithiophosphates and a variety of other well-known additives.

It is also contemplated the modified succinimides of this invention may be employed as dispersants and detergents in hydraulic fluids, marine crankcase lubricants and the like. When so employed, the modified succinimide is added at from 0.1 to 5 percent by weight (on a dry modified succinimide basis) to the oil, and preferably at from 0.5 to 5 weight percent (on a dry modified succinimide basis).

Additive concentrates are also included within the scope of this invention. The concentrates of this invention usually include from 90 to 10 weight percent of an organic liquid diluent and from 10 to 90 weight percent (on a dry modified succinimide basis) of the additive of this invention. Typically, the concentrates contain sufficient diluent to make them easy to handle during shipping and storage. Suitable diluents for the concentrates include any inert diluent, preferably an oil of lubricating viscosity, so that the concentrate may be readily mixed with lubricating oils to prepare lubricating oil compositions. Suitable lubricating oils which can be used as diluents typically have viscosities in the range from about 35 to about 500 Saybolt Universal Seconds (SUS) at 100° F. (38° C.), although an oil of lubricating viscosity may be used.

Fuel Compositions and Concentrates

Typically the fuel composition will about from 10 to 10,000 weight parts per million, preferably from 30 to 2,000 weight parts per million, of base fuel. This is based on active ingredient including the other dispersant reaction products but excluding inactives, for example diluent oil and any unreacted alkene or poly alpha-olefins etc, carried through from the preparation of polyalkylene succinic anhydride or terpolymer. If other detergents are present, a lesser amount of the modified succinimide may be used. Optimum concentrations can vary with the particular base oil and the presence of other additives, but, can be determined by routine procedures.

The compositions of this invention may also be formulated as a fuel concentrate, using an inert stable oleophilic organic solvent boiling in the range of about 150° F. to 400° F. (65° C. to 205° C.). Preferably, an aliphatic or an aromatic hydrocarbon solvent is used, such as benzene, toluene, xylene or higher-boiling aromatics or aromatic thinners. Aliphatic alcohols of about 3 to 8 carbon atoms, such as isopropanol, isobutylcarbinol, n-butanol and the like, in combination with hydrocarbon solvents are also suitable for use with the fuel additive. The present fuel concentrate will typically contain about from 20 to 60 wt. % of the present composition or an active ingredient basis.

PREPARATIONS AND EXAMPLES

A further understanding of the invention can be had in the following nonlimiting Preparations and Examples. Wherein unless expressly stated to the contrary, all temperatures and temperature ranges refer to the Centigrade system and the term "ambient" or "room temperature" refers to about 20° C.–25° C. The term "percent" or "%" refers to weight percent and the term "mole" or "moles" refers to gram moles. The term "equivalent" refers to a quantity of reagent equal in moles, to the moles of the preceding or succeeding reactant recited in that example in terms of finite moles or finite weight or volume.

Example 1

Preparation of a Terpolymer from 2034 MW High Methylvinylidene Polybutene (MVP), $C_{18}$ Alpha Olefin, and Maleic Anhydride (MA) with a 70/30 MVP/Alpha Olefin Ratio.

To a 5000 ml flask equipped with mechanical stirrer, nitrogen inlet tube, Dean Stark trap, and condenser was added 785.4 grams, 0.386 mol, of high methylvinylidene polybutene, Glissopal ES 3252 which contained 75.3% methylvinylidene content, and had $M_n$ of 2034. To this was added 38.6 grams $C_{18}$ alpha olefin (AO), 0.153 mol, and 122 grams $C_9$ aromatic solvent. The MVP/alpha olefin CMR was 2.52. This was heated with stirring at 130°–135° C. for 2 hours under a nitrogen sweep to remove any water that may have been present. This was then cooled to 85° C. and to this was added 44.56 grams, 0.45 mol, maleic anhydride. The maleic anhydride/total olefin ratio was 0.83. The temperature was increased to 125°–130° C. To this over a period of 2 hrs, was added 0.80 grams di-t-butylperoxide (DTBP), 0.0055 mol, in five equal portions. This was then heated an additional 2 hours at 145°–150° C. Then additional $C_9$ aromatic solvent, 100 grams, was added. The product was then cooled and filtered. The product was analyzed and consisted of 50.6% actives and had a SAP number of 25.4 mg KOH/grams sample.

Examples 2–13

The following examples 2–13 were prepared according to the general procedure given in example 1, but with the reagents, and CMR's listed in Table 1. In all examples a $M_n$ of 2034 was used for the polyisobutene.

TABLE 1

| Ex | MVP gram | AO | AO, g | MVP/AO mole ratio | C₉ Solvent gram | Diluent Oil, gram | MA grams | DTBP gram | SAP | % actives |
|---|---|---|---|---|---|---|---|---|---|---|
| 1 | 785.4 | C18 | 38.6 | 70/30 | 222 | 0 | 44.56 | 0.8 | 25.4 | 50.6 |
| 2 | 561 | C18 | 64.39 | 50/50 | 222 | 0 | 44.56 | 0.8 | 42.3 | 61.6 |
| 3 | 785.4 | C14 | 30.05 | 70/30 | 222 | 0 | 44.56 | 0.8 | 25.7 | 55.8 |
| 4 | 561 | C14 | 50.08 | 50/50 | 272 | 600 | 44.56 | 0.8 | 24.3 | 33.5 |
| 5 | 561 | C14 | 50.08 | 50/50 | 20 | 122 | 44.56 | 0.96 | 25.5 | 42.4 |
| 6 | 561 | C14 | 50.08 | 50/50 | 0 | 244 | 44.56 | 0.96 | 29.6 | 36.1 |
| 7 | 561 | C14 | 50.08 | 50/50 | 0 | 244 | 55.45 | 0.96 | 44.6 | 45.9 |
| 8 | 785.4 | C10 | 21.46 | 70/30 | 122 | 122 | 44.56 | 0.96 | 31.4 | 46.9 |
| 9 | 561 | C10 | 35.77 | 50/50 | 122 | 0 | 44.56 | 0.96 | 50.9 | 64.5 |
| 10 | 561 | C14 | 50.08 | 50/50 | 122 | 122 | 98.06 | 0.8 | 70.8 | 60.6 |
| 11 | 561 | C14 | 50.08 | 50/50 | 122 | 122 | 196.12 | 0.8 | 20.3 | 28.9 |
| 12 | 785.4 | C18 | 38.6 | 70/30 | 122 | 122 | 98.06 | 0.8 | | 39.5 |
| 13 | 561 | C18 | 64.39 | 50/50 | 0 | 0 | 98.06 | 0.8 | | |

Example 14
Preparation of Triethylenetetramine Polysuccinimide from 2034 Molecular Weight Polyisobutene, $C_{14}$ Alpha Olefin, and 0.8 Amine/Terpolymer Anhydride CMR.

The terpolymer from Example 4, (which had 33.5% actives and a SAP number of 24.3 mg KOH/g sample) 250 grams, 54.1 mmol, was added to a 500 mL three neck flask equipped with an overhead stirrer, nitrogen inlet tube, Dean Stark trap and condensor and this was heated to 100° C. with stirring under nitrogen. To this was added TETA, 6.34 g, 43.4 mmol. The amine/terpolymer anhydride CMR was 0.8. This was heated at 160° C. for 4.5 hours. Then the product was cooled. The product had 0.89% N, a TBN of 16.7 mg KOH/g sample, a TAN of 0.93 mg KOH/g sample, and a viscosity @100° C. of 163.4 cSt.

Examples 15–17
Examples 15–17 were prepared following the procedure from example 15 but with the reagents listed in Table 2. The terpolymer used was from Example 4, the MVP/AO ratio was 1.0, and the alpha olefin used was $C_{14}$.

TABLE 2

| Example | Amine | Amine/Anhydride CMR | % N | TBN | Vis | TAN |
|---|---|---|---|---|---|---|
| 14 | TETA | 0.8 | 0.89 | 16.7 | 163 | 0.93 |
| 15 | TETA | 0.5 | 0.61 | 8.9 | 195 | 3.12 |
| 16 | DETA | 0.8 | 0.74 | 11 | 162 | 0.83 |
| 17 | DETA | 0.5 | 0.56 | 4.3 | 390 | 3.21 |

While the present invention has been described with reference to specific embodiments, this application is intended to cover those various changes and substitutions that may be made by those skilled in the art without departing from the spirit and scope of the appended claims.

What is claimed is:

1. A terpolymer composition comprising the reaction product obtained by the terpolymerization of a 1-olefin having at least five carbon atoms, an unsaturated acidic reagent, and a 1,1-disubstituted olefin.

2. A terpolymer according to claim 1 wherein said 1-olefin has an average of from 10 to 30 carbon atoms.

3. A terpolymer according to claim 1 wherein said unsaturated acidic agent is maleic anhydride.

4. A terpolymer according to claim 1 wherein said terpolymer has an average $M_n$ of from 600 to 100,000.

5. A process for preparing a polysuccinimide which comprises reacting a mixture under reactive conditions, wherein the mixture comprises:
   (a) the terpolymer according to claim 1; and
   (b) a nitrogen-containing compound selected from the group consisting of an amine and a polyamine.
   wherein said mixture contains from 0.1 to 1.5 equivalents of said nitrogen-containing compound per equivalent of acidic groups in said terpolymer.

6. A process for preparing a polysuccinimide according to claim 5 wherein said nitrogen-containing compound is a polyamine having at least three nitrogen atoms and 4 to 20 carbon atoms.

7. A process for preparing a polysuccinimide according to claim 5 wherein the reaction mixture further comprises at least one of the following:
   (a) an alkenyl or alkylsuccinic acid derivative,
   (b) a copolymer of a first unsaturated acidic reagent and a 1-olefin,
   (c) a copolymer of a second unsaturated acid reagent and a 1,1-disubstituted olefin,
   (d) a polycarboxylic acid derivative, and
   (e) mixtures thereof;
   wherein the first unsaturated acidic reagent and the second unsaturated acidic reagent are the same or different.

8. A concentrate comprising from 20 to 60 wt. % of a polysuccinimide prepared by the process of claim 5 and from 80 to 40 wt. % of an organic diluent.

9. A lubricating oil composition comprising a major amount of an oil of lubricating viscosity and a minor amount of a polysuccinimide composition prepared by the process of claim 5.

10. A post-treated polymer prepared by treating a polysuccinimide prepared by the process of claim 5 under reactive conditions with a boron compound selected from the group consisting of boron oxide, boron halide, boric acid, and esters of boric acid.

11. A post-treated polysuccinimide composition prepared by treating a polysuccinimide prepared by the process of claim 5 with a cyclic carbonate or a linear mono- or poly-carbonate under reactive conditions.

12. The post-treated polysuccinimide composition of claim 11 wherein said cyclic carbonate is ethylene carbonate.

13. A lubricating oil composition comprising a major amount of an oil of lubricating viscosity and a minor amount of the post-treated polysuccinimide composition of claim 11.

14. A concentrate comprising from 20 to 60 wt. % of the post-treated polysuccinimide composition of claim 11 and from 80 to 40 wt. % of an organic diluent.

15. A terpolymer composition comprising the reaction product obtained by the terpolymerization of a 1-olefin having at least five carbon atoms, an unsaturated acidic reagent, and a 1,1-disubstituted olefin, wherein said 1,1-disubstituted olefin has an average Mn of from 500 to 5,000.

16. A terpolymer according to claim 15 wherein said 1,1-disubstituted olefin is a 1,1-disubstituted polyisobutylene.

* * * * *

UNITED STATES PATENT AND TRADEMARK OFFICE
CERTIFICATE OF CORRECTION

PATENT NO. : 5,792,729
DATED : August 11, 1998
INVENTOR(S) : James J. Harrison, et al.

It is certified that error appears in the above-identified patent and that said Letters Patent is hereby corrected as shown below:

On the title page, item

[73] Chevron Chemical Corporation, San Ramon, Calif.
should be
Chevron Chemical Company, San Ramon, Calif.

Signed and Sealed this

Fourth Day of July, 2000

Attest:

Attesting Officer

Q. TODD DICKINSON

Director of Patents and Trademarks